Sept. 23, 1952    W. E. MARTIN    2,611,496
FOLDABLE TRAILER HITCH
Filed July 15, 1948    4 Sheets-Sheet 1
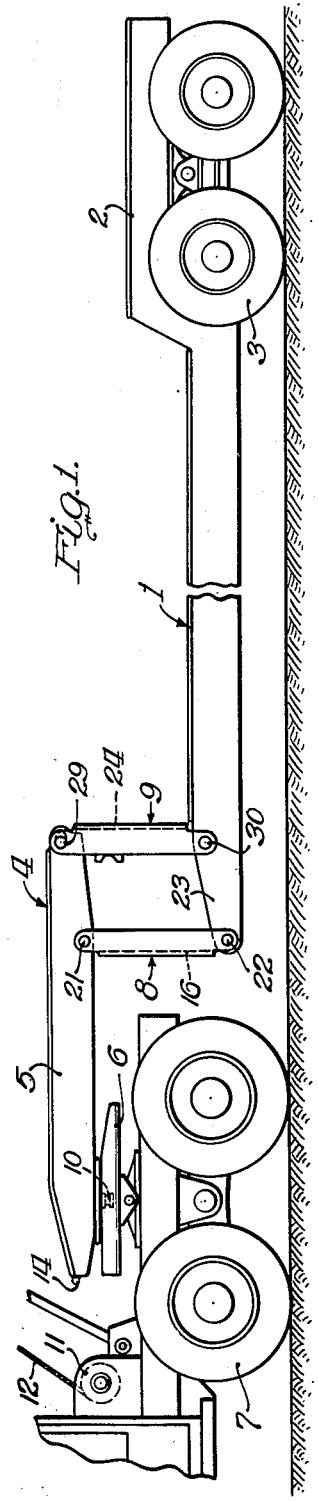
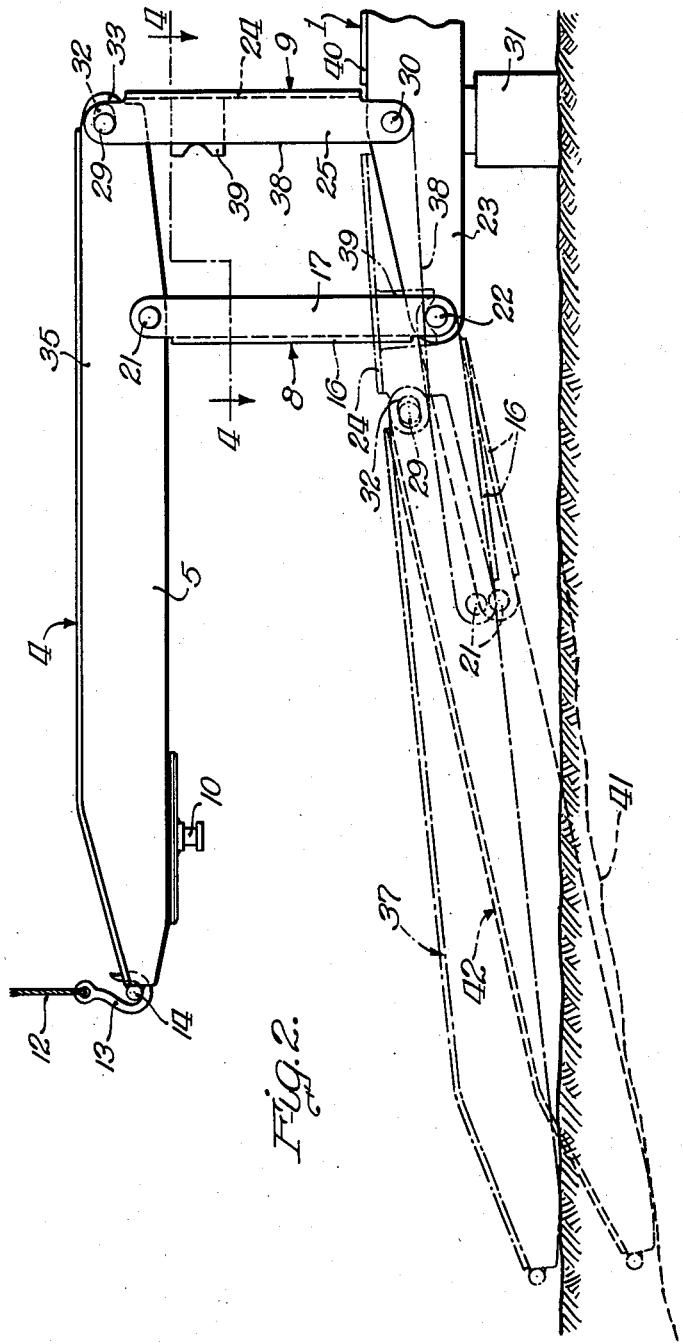
INVENTOR.
William E. Martin
BY
Eberhard E. Wettley
Atty.

Sept. 23, 1952 W. E. MARTIN 2,611,496
FOLDABLE TRAILER HITCH
Filed July 15, 1948 4 Sheets-Sheet 2
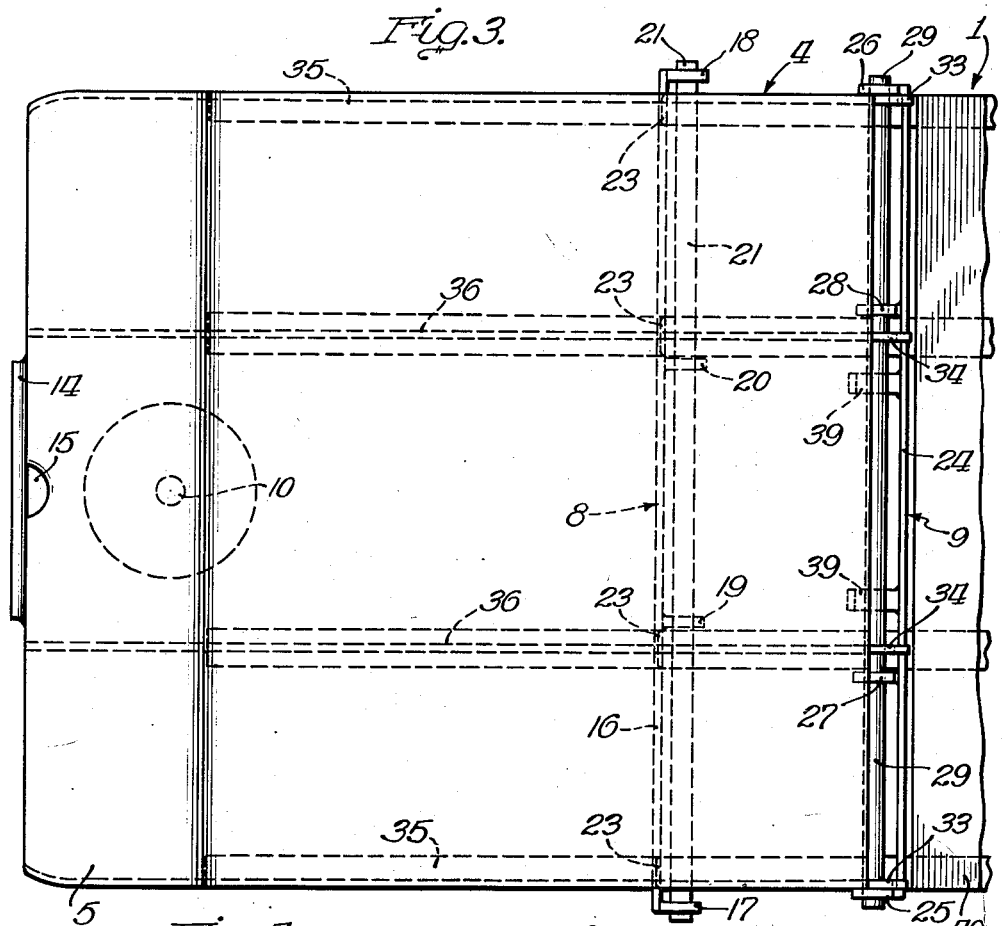
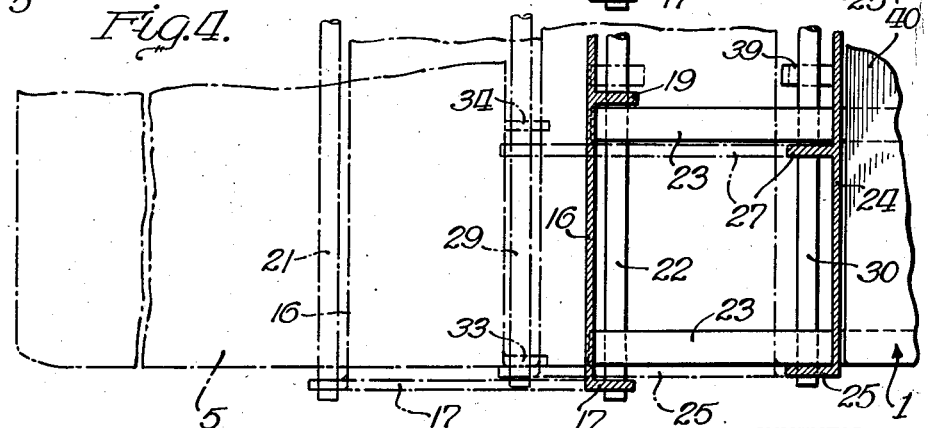
INVENTOR.
William E. Martin
BY
Eberhard E. Wettley
Atty.

Sept. 23, 1952     W. E. MARTIN     2,611,496
FOLDABLE TRAILER HITCH
Filed July 15, 1948     4 Sheets-Sheet 3
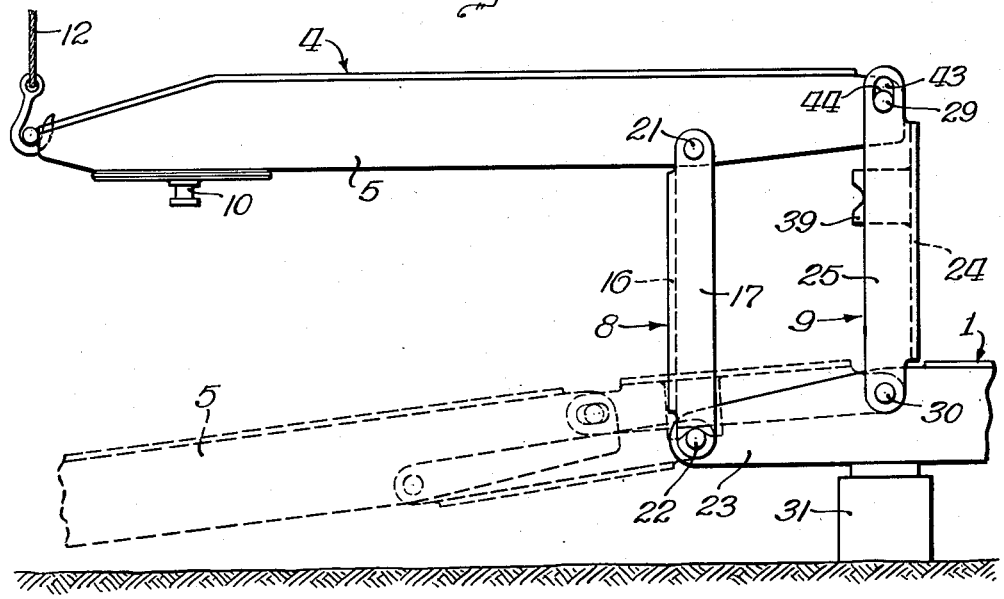
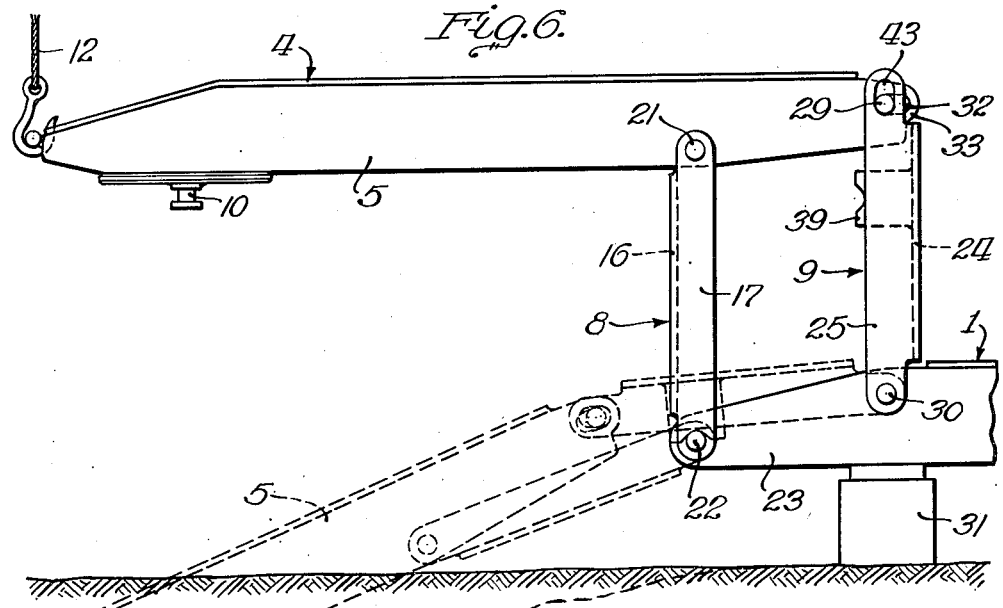
INVENTOR.
William E. Martin
BY
Eberhard E. Wettley
Atty.

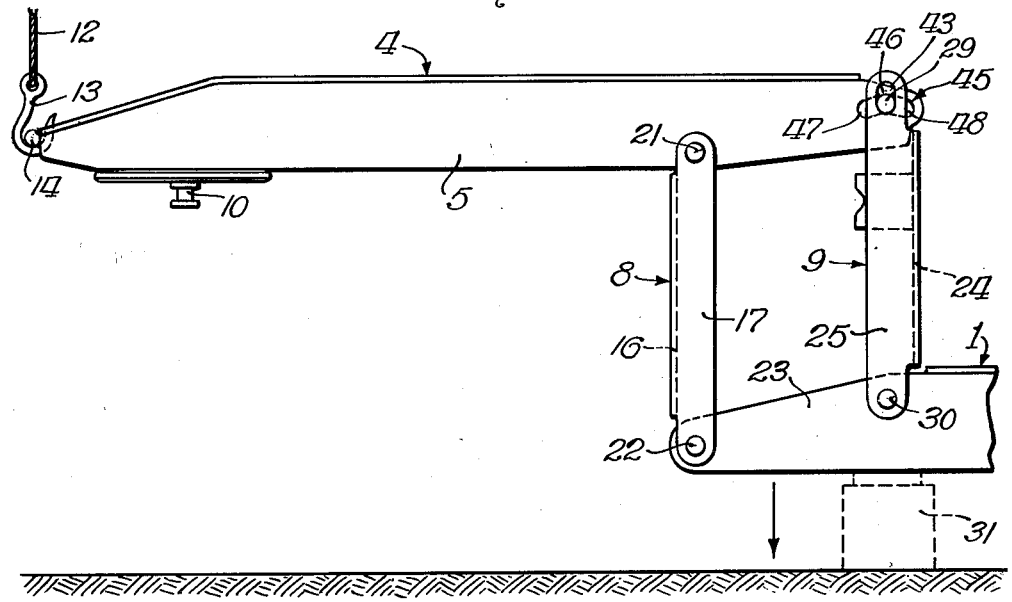
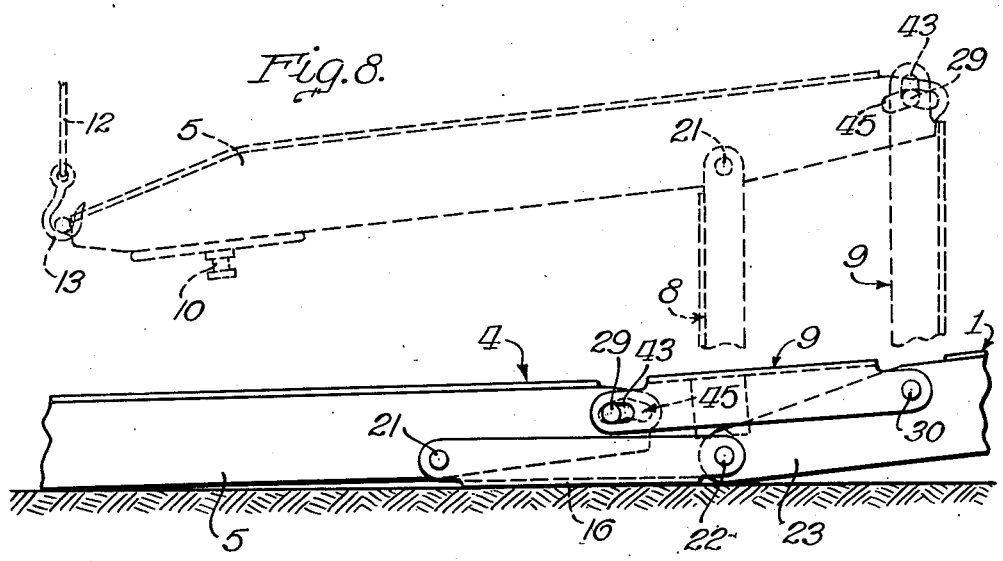

Patented Sept. 23, 1952

2,611,496

UNITED STATES PATENT OFFICE 2,611,496

FOLDABLE TRAILER HITCH

William E. Martin, Kewanee, Ill.

Application July 15, 1948, Serial No. 38,840

13 Claims. (Cl. 214—85)

This invention relates to a foldable trailer hitch designed to incorporate a parallel link structure to connect the tongue of the hitch to the bed of a machinery hauling trailer, the entire combination of means permitting a variable disposition of the hauling tongue in certain positions with respect to the load carrying bed to enhance the flexibility and use of operation of a unit of this kind.

In a trailer for hauling heavy machinery various ways are used to load machinery and the present invention is more particularly adapted for use with a trailer having front end loading facilities including a foldable hitch wherein the trailer towing tongue may be lowered into reclining or ground engaging position. Further, the tongue is arranged to form a ramp to guide the machinery to or from the forward loading end of the trailer bed.

It is one of the main objects of this invention to provide a foldable hitch wherein the tongue and trailer bed are joined by parallel link mechanisms that will normally maintain the tongue and bed in parallel relation under towing conditions, but incorporating means to allow out of parallel relationship between the tongue and bed under loading and unloading conditions. To maintain the parallel link mechanisms substantially parallel for all practical purposes under towing conditions and also during the raising and lowering of the trailer bed through the tongue of the hitch, the strains and stresses are efficiently distributed in a comparatively simple structure that simultaneously functions as a means to hold the tongue in a predetermined relation with respect to the trailer bed under the usual conditions of operation. At the same time, the link mechanism has certain other cooperative means whereby the relationship between the tongue and the bed can be changed and more specifically during the reclining stage of the tongue which is brought about during loading and unloading of the machinery that has been transported by the trailer for use at a designated field of operation.

Another object therefore of the present design of foldable trailer hitch is to provide simple, efficient mechanism to hold the tongue of the hitch in a fixed and predetermined plane with respect to the plane of the bed of the trailer, and wherein the tongue is adapted to change this relationship under loading conditions to automatically accommodate itself to the roadway or general terrain of the ground adjacent the loading end of the trailer regardless of the exact position of the loading end of the trailer bed.

Thus, the ground may slope downwardly at the loading point or upwardly as the case may be. The bed of the trailer may be supported upon blocks or the end of the bed may be lowered to the ground as shown and described in my copending application Serial No. 38,838, filed of even date herewith. These various conditions or combinations thereof can be readily overcome through the use of the foldable trailer hitch of this invention which allows mechanically efficient trailer hauling when machinery is being transported, and which also provides a flexible arrangement to take care of normal loading difficulties with ease and facility without further blocking, shoring or providing other auxiliary means that would otherwise be necessary for the loading conditions above mentioned.

A further object of this invention is to use the tongue as a ramp for both loading and unloading while still functioning in the capacity of remaining in a predetermined relation to the bed when in transportable position but being capable of assuming other variable positions upon out of level terrain adjacent the connected end of the trailer bed during the loading or unloading operations.

Further objects of this invention reside in the inherent construction of the links wherein one of the links forms a bridging span during loading to provide a substantially continuous runway or intermediate ramp between the tongue and the bed, and the links also include means to furnish adequate support for the trailer end of the tongue and said span when the tongue is disposed upon the ground functioning as a ramp to permit machinery to properly pass across the front end of the bed of the trailer. All other objects and advantages inherent in the foldable trailer hitch of the present design and invention shall hereinafter appear in the following detailed description thereof having reference to the accompanying drawings forming a part of this specification.

In the drawings:

Fig. 1 is a side elevational view of a trailer incorporating the new foldable trailer hitch;

Fig. 2 is an enlarged fragmentary side elevational view of the front end of the trailer to better illustrate certain other details of construction of the foldable trailer hitch;

Fig. 3 is a plan view of the same portion of the trailer shown in Fig. 2;

Fig. 4 is a horizontal cross sectional view taken substantially along the line 4—4 in Fig. 2 to illustrate further details of construction of the foldable trailer hitch;

Fig. 5 is a fragmentary side elevational view of the front end of a trailer embodying a foldable trailer hitch of modified design;

Fig. 6 is another view like Fig. 5 but showing a modified form of foldable trailer hitch that combines the Fig. 2 and Fig. 5 constructions;

Fig. 7 is a fragmentary side elevational view of the front end of a trailer with a foldable trailer hitch incorporating a further suggested modification in the design thereof which is not shown in the other hitches; and Fig. 8 is a view of the Fig. 7 construction with the tongue of the hitch in reclining position for loading purposes, and also with the adjacent end of the trailer bed resting upon the ground or other trailer supporting surface.

Referring now to Figs. 1 and 4 inclusive, the trailer comprises a load carrying bed 1 having a raised rear platform 2 supported upon the wheeled carriage 3, with the forward end of the bed supported by means of a foldable trailer hitch 4 having a tongue 5 connected with a conventional fifth wheel 6 of a tractor 7, and said tongue and bed are joined by the dual parallel link mechanisms 8 and 9. This constitutes a gooseneck type of trailer adapted to be drawn by a power vehicle and one that has a tongue representing a ramp as part of the hitch means which can be folded to the ground with the trailer bed supported upon blocks or lowered to the ground as conditions of operation best warrant.

Tongue 5 is of bed width and may be provided with any type of hitch pin. In the present construction the tongue is brought into contact with the ground so for better efficiency and practicability a removable hitch pin 10 is used which conforms with the structure shown and described in my copending application Serial No. 38,837, filed of even date herewith. The raising and lowering of the hitch, and the bed with the hitch if desired, is done by means of a conventional hoist or windlass 11 usually carried upon the pulling vehicle or tractor 7, such hoist using a cable 12 and hook 13 for connection about a bar 14 welded to the tongue 5 with the hook passing through a clearance hole 15 in the tongue deck adjacent the bar 14 as best seen in Fig. 3.

The link mechanisms 8 and 9 are similar but oppositely related or positioned with respect to each other as will be evident in the following explanation. Link 8 is of U-shaped construction having a flat cross panel 16 terminating in end flanges 17 and 18 that are formed at right angles with respect to the panel 16 to position the flanges in parallel relation. Two or more reinforcing plates 19 and 20 are welded or otherwise fastened intermediate the length of the panel 16 and such plates generally conform to the shape of the flanges 17 and 18.

The terminal ends of the flanges 17 and 18, and the plates 19 and 20 are all provided with aligned apertures to receive pivotal shafts 21 and 22 that extend parallel and transversely through the tongue 5 and the sloping bed projections 23 respectively. Link 8 is positioned as best seen in Figs. 2, 3, and 4 with its panel 16 to the front of the trailer forming a protective shield for the pivotal arrangement thereof and for the second link 9 and its associated parts whenever the trailer is in transportable condition. In addition, the central plates 19 and 20 are spaced to flank the adjacent inner faces of the two middle projections 23 of the bed 1 as best shown in Fig. 3 which counteracts side motion of the link 8, while the tongue 5 is centered with respect to the link 8 through its connection with the mechanism comprising link 9 as seen in Figs. 3 and 4.

Link 9 is also U-shaped and comprises a cross panel 24 having end flanges 25 and 26 as a part thereof with intermediate plates 27 and 28 all similarly arranged as in link 8 structure, but with the panel 24 normally facing the trailer bed to protect the mechanisms of link 9 and the adjacent structure of link 8 from damage by machinery and other equipment being hauled while the tongue 5 is in raised towing position. Thus the links 8 and 9 can be considered as oppositely disposed or related by reason of the locations of the panels 16 and 24 of such links.

The ends of the flanges 25 and 26 together with the ends of the plates 27 and 28 are also all provided with aligned apertures for the reception of pivotal shafts 29 and 30 which are parallel and connected with the tongue 5 and bed projections 23 respectively. Thus link 9 is used as link 8 and the spacing of the axial locations of shafts 21—22 and shafts 29—30 is such to comprise a parallelogram arrangement when viewed as in Figs. 1 and 2. For all practical considerations the links 8 and 9 together with the tongue and bed provide a parallel link structure capable of holding the tongue 5 in a plane parallel to the plane of the bed 1 when the tongue is raised or when it is being moved from raised position into ground engaging position or vice versa.

However, with bed 1 raised or supported upon blocks such as 31, the tongue 5 could not be used to serve the dual purpose of a towing instrumentality and also as a ramp for loading unless provisions are positively made to allow the tongue the facility to move out of its parallel plane relationship with respect to the plane of bed 1 when the tongue is to serve as a ramp.

This has been done by the provision of aligned horizontal slots 32 formed in the projections 33—33 and 34—34 which form parts of the tongue side channels 35—35 and intermediate I-beams 36—36. Slots 32 are indicated as extending rearwardly from the true parallelogram relationship as indicated by the axis of shaft 29 in Fig. 2 but this is not a limiting factor.

Attention is directed to the tongue 5 in Fig. 2 and to what action occurs at the link mechanisms 8 and 9 when the tongue 5 is held by the cable 12 or if such tongue is supported upon the fifth wheel 6 in Fig. 1. In either case shaft 21 provides an upper fulcrum for the tongue 5 causing vertical forces to act upon shaft 29 but since the slots 32 are horizontal the level or fixed position of the tongue with respect to the trailer bed does not change. The upper end of link 9 will assume a fixed position under vertical load forces which will prevent fore and aft movement of shaft 29 in slots 32 through frictional locking of the joined parts. With this arrangement an ideal parallel link suspension is obtainable in the interrelation of the hitch and trailer bed as best represented in Fig. 1.

The lowered position of the tongue comprising its out of parallel position with respect to the bed is best seen in Fig. 2 at 37 wherein the dot and dash lines show the tongue with its outer end resting upon the ground and with the hitch pin 10 removed. When in the position 37 the slotted rear end of the tongue 5 is stopped in its descent through link 9 when the collective edges 38 of the flanges 17—18 and plates 19—20 come to rest upon shaft 22. Additional abutment blocks 39 may also be used for engaging shaft 22 and blocks 39 can be secured to panel 24 of link 9 in any selected positions to carry the machinery that passes over panel 24. Panel 24 when rotated downwardly as described forms a bridge to span the gap between the deck of the lowered ramp tongue 5 and the load carrying plate 40 forming a machinery carrying surface of the trailer bed.

With link 9 down against shaft 22 as explained the link is well supported and braced to carry a heavy load and link 9 also forms a fixed bed extension when down which places shaft 29 beyond the forward end of bed 1 and its projections 23 to support the rear end of the tongue 5 directly from a point spaced outwardly from the front end of the bed 1. Link 8 merely takes on an inactive role when the tongue is lowered although it does directly coact to prevent side sway of the tongue and to maintain lateral stability thereof with respect to the end of the trailer bed. Both panels being solid and flat will act to counteract weaving and warping to stabilize the tongue.

As link 9 stops in the tongue limiting position, link 8 may continue to swing downwardly and it is at this point that the tip end of the tongue continues to lower by means of the shaft and slot arrangement 29 and 32. The tongue can therefore move out of its heretofore parallel relationship with respect to the bed to recline angularly in relation to the ground forming a ramp with the rear end of the tongue properly positioned with respect to the intermediate runway surface comprising panel 24 of link 9 which forms the proper continuity of loading surface leading to the bed. Thus panels 16 and 24 also form protective shields for the pivotal parts, etc., of the hitch mechanisms when in lowered position with panel 16 protecting such parts against damage from beneath while the panel 24 shields the parts against damage from above.

If the ground contour slopes downwardly away from the loading end of the trailer bed as shown at 41 in Fig. 2, the tongue 5 may continue to drop its outer end further into the dotted line position shown at 42. And the raising of the tongue reverses the process by slowly regaining the lost motion connection between shaft 29 and the slots 32 in tongue 5 until links 8 and 9 are practically parallel at which time the tongue will lift in a plane parallel to the bed plane raising the links until the full line position of Fig. 2 is attained at which time further lift will also raise the adjacent bed end of the trailer to prepare the latter for transportation.

It should be observed that the positions of the flanges 17—18 and 25—26 are staggered in plan as shown in Figs. 3 and 4, and the same is true with the plates 19—20 and 27—28 so that these respective parts do not interfere in lowered position. Fig. 4 shows the relationship of the aforesaid parts in dot and dash lines as they would appear with the tongue 5 down to form the loading ramp of the trailer.

The modified constructions shown in Figs. 5, 6 and 7 are substantially the same as the described hitch except for the particular shaft and slot arrangements and will for the most part bear the same reference characters throughout but for the changes suggested.

In Fig. 5, the same results are obtained by providing aligned vertical slots 43 in the upper and outer ends of the flanges 25—26 and plates 27—28 of link 9, with shaft 29 in this instance passing through aligned openings 44 in the extensions 33—33 and 34—34 of the tongue 5, which openings snugly but rotatably receive the cross shaft 29 at this juncture of the parts named.

Fig. 6 combines the tongue structure of the Fig. 2 design and the link structure of the Fig. 5 link 9. By using the double slot mechanism here seen, small slots in the tongue and link arranged as shown will accommodate considerable drop of the tongue as indicated by the dotted lines to show an intermediate position of the tongue with this structure. In the illustrations in the drawings attention is directed to the fact that the slotted structures have been exaggerated somewhat to better show the inventive features of this design. In actual practice these slot clearances are made smaller, but their relationships and placement substantially follow the disclosure.

Figs. 7 and 8 show a construction wherein the link 9 uses the vertical slots 43 of Fig. 5, but wherein the tongue 5 includes aligned slots 45 of double ended design in the tongue parts 33—33 and 34—34. Slots 45 each are formed with a high point 46 and oppositely declining fore and aft portions 47 and 48. The high point 46 determines the true parallelogram relationship of shaft 29 and the latter will seek this position whenever the tongue is raised. This action takes place through the interaction of the slot portions 47 and 48, that incline upwardly toward the point 46 creating an automatic cam action to move the shaft from either end of slot 45 toward the high midpoint thereof.

Although a straight slot may be used as in the Fig. 2 construction, the Fig. 7 design does introduce the automatic centering means which can be efficiently used in hitch structures wherein the front end of the bed may be retained upon blocks 31 or in cases where the bed is lowered directly to the ground as shown in Fig. 8. In the latter disclosure, it should be observed that panel 16 of link 8 forms a ground rest projecting away from the ground engaging end of the bed projections 23, and that panel 16 will readily accommodate itself to the surface contour of the ground to adequately position the tongue for proper approach of vehicles to be carried by the trailer which can easily move upon the tongue ramp over its forward tapered tip end so formed for this purpose.

Any other changes and variations in the exact design, construction or combination of the main and secondary elements of the foldable trailer hitch of this invention shall be governed by the breadth and scope of the language of the claims appended hereto.

What I claim is:

1. A foldable hitch for a machinery hauling trailer comprising a tongue, and link mechanisms connecting said trailer and the tongue to control the movements of the tongue relative to the trailer, said link mechanisms comprising pivotal means to normally hold said tongue in a plane disposed parallel to the plane of the trailer while in transportable position and during the lowering of the tongue toward the ground; and lost motion means interposed between said link mechanisms and said tongue to allow the latter to assume an out of parallel relationship with respect to said trailer when the tongue is lowered to the ground, said lost motion means including parts of said tongue having horizontally disposed slots formed therein for the reception of certain of the pivotal means carried by said link mechanisms.

2. A foldable hitch for a machinery hauling trailer comprising a tongue assembly, a bed assembly to carry the machinery, and link mechanisms extending between said assemblies including pivotal means joining said assemblies for disposing said tongue assembly in parallel relationship with respect to said bed assembly during transportation, said pivotal means being adapted to guide said tongue assembly while lowering the latter toward the ground, and lost motion means interposed between one of said assemblies and said link mechanisms to allow said tongue assembly to move out of said parallel relationship with respect to the bed assembly and to incline the tongue assembly with respect to the ground when lowered thereto, said lost motion means comprising certain parts of said one assembly including horizontally disposed slots formed therein for the reception of certain of the pivotal means of said link mechanisms.

3. A foldable hitch for a machinery hauling trailer comprising a tongue, and link mechanisms connecting said trailer and the tongue to control the movements of the tongue relative to the trailer, said tongue providing means to form a ramp for said trailer to load and unload machinery, said link mechanisms comprising pivotal means to normally hold said tongue in a plane disposed parallel to the plane of the trailer while in transportable position and during the lowering of the tongue toward the ground, and lost motion means interposed between said link mechanisms and said tongue to allow the latter to assume an out of parallel relationship with respect to said trailer when the tongue is lowered to the ground, said lost motion means including parts of said tongue having horizontally disposed slots formed therein for the reception of certain of the pivotal means carried by said link mechanisms, and one of said link mechanisms providing surface means to form an auxiliary ramp between said tongue and said trailer when said tongue is lowered and in ground contacting position.

4. A foldable hitch for a machinery hauling trailer comprising a tongue assembly, a bed assembly to carry the machinery, said tongue assembly providing a ramp for loading and unloading machinery from said bed assembly when said foldable hitch engages the ground, and link mechanisms extending between said assemblies including pivotal means joining said assemblies for disposing said tongue assembly in parallel relationship with respect to said bed assembly during transportation, said pivotal means being adapted to guide said tongue assembly while lowering the latter toward the ground, and lost motion means interposed between one of said assemblies and said link mechanisms to allow said tongue assembly to move out of said parallel relationship with respect to the bed assembly and to incline the tongue assembly with respect to the ground when lowered thereto, said lost motion means comprising certain parts of said one assembly including horizontally disposed slots formed therein for the reception of certain of the pivotal means of said link mechanisms, and one of said link mechanisms having surface means to form an auxiliary ramp between said assemblies when said tongue assembly is lowered into ground contact.

5. In a trailer, a bed, a tongue, and operable means connecting said bed and tongue to move the latter from raised towing position to ground contacting position, said tongue providing a ramp for said bed when disposed in said latter position, said operable means comprising a pair of freely swingable links having pivotal connections with said bed and tongue through shafts arranged in parallelogram order whereby said tongue is normally positioned parallel to said bed, and said tongue having fore and aft slots therein to coact with one of said pivotal shafts to maintain said tongue parallel to said bed while the tongue is raised and in operable towing position, said one shaft and said fore and aft slots functioning to let said tongue move out of parallel relation with respect to said bed only when the tongue is lowered.

6. In a trailer, a bed, a tongue, and operable means connecting said bed and tongue to move the latter from raised towing position to ground contacting position, said tongue providing a ramp for said bed when disposed in said latter position, said operable means comprising a pair of links having pivotal connections with said bed and tongue and arranged in parallelogram order whereby said tongue is normally positioned parallel to said bed, and said tongue having fore and aft slots therein to coact with one of said pivotal connections, said latter connection and said slots functioning to let said tongue move out of parallel relation with respect to said bed when the tongue is lowered, said fore and aft slots each having portions thereof extending to either side of the theoretical parallelogram axial location of the pivotal means coacting with such slots.

7. In a trailer, a bed, a tongue, and operable means connecting said bed and tongue to move the latter from raised towing position to ground contacting position, said tongue providing a ramp for said bed when disposed in said latter position, said operable means comprising a pair of links having pivotal connections with said bed and tongue and arranged in parallelogram order whereby said tongue is normally positioned parallel to said bed, and said tongue having fore and aft slots therein to coact with one of said pivotal connections, said latter connection and said slots functioning to let said tongue move out of parallel relation with respect to said bed when the tongue is lowered, said fore and aft slots each having portions thereof extending to either side of the theoretical parallelogram axial location of the pivotal means coacting with such slots, and said slot portions of each slot sloping oppositely downwardly away from said theoretical axial location of said pivotal means which coincides with the high central portion of the aforesaid slots.

8. In a trailer, a bed, a tongue, and operable means connecting said bed and tongue to move the latter from raised towing position to ground contacting position, said tongue providing a ramp for said bed when disposed in said latter position, said operable means comprising a pair of links having pivotal connections with said bed and tongue and arranged in parallelogram order whereby said tongue is normally positioned parallel to said bed, and said tongue having fore and aft slots therein to coact with one of said pivotal connections, the ends of one of the links connected with said one pivotal means having vertically disposed slots formed therein to further coact with the aforesaid one pivotal means, the slots in the tongue and cited link comprising cooperative means to allow the tongue to move out of parallel relation with respect to said bed when the tongue is lowered.

9. In a trailer, a bed, a tongue, and operable means connecting said bed and tongue to move the latter from raised towing position to ground contacting position, said tongue providing a ramp for said bed when disposed in said latter position, said operable means comprising a pair of links having pivotal shaft connections with said bed and tongue arranged in parallelogram order whereby said tongue is normally positioned parallel to said bed, said links being connected by fore and aft shafts with said bed and by fore and aft shafts with the tongue, the tongue ends of the rearward link having vertically positioned slots formed therein for coaction with the rear shaft of said tongue, whereby lowering of said tongue rotates said slotted links to dispose the slots horizontally permitting the tongue to move out of parallel relation with respect to the bed to lower the end of the tongue to the ground as a ramp approach for said bed, said rearward slotted link having abutment means thereon for engaging one of the shafts of said other link to start said out of parallel movement of said tongue.

10. In a trailer, a bed, a tongue, and operable means connecting said bed and tongue to move the latter from raised towing position to ground contacting position, said tongue providing a ramp for said bed when disposed in said latter position, said operable means comprising a pair of links having pivotal connections with said bed and tongue, said links each comprising a continuous transverse panel having angularly formed sides constituting means for connection with said pivotal means with the sides of one panel disposed in staggered relation with respect to the sides of the other panel to allow limited and adjacent overlap of the respective sides for lateral stability when said tongue is lowered, said link panels being positioned oppositely outwardly with respect to each other to form protective shields for the pivotal means when said tongue is in raised position, and said panels forming upper and lower protective shields for said same pivotal means when said tongue is dropped into lowered position contacting the ground and providing a ramp approach for said bed.

11. In a trailer, a bed, a tongue, and operable means to connect said tongue with the bed to raise and lower the tongue with respect to said bed, said tongue comprising a ramp approach to said bed when the tongue is down, and said operable means comprising U-shaped links each having a transverse panel with angularly formed sides, a pair of cross shafts connecting the ends of the sides of the panels with the tongue, and a pair of cross shafts connecting the other ends of the sides with the bed, said shafts being positioned in axial locations forming a parallelogram to cause the tongue to move parallel with respect to said bed, and lost motion means interposed at one of the shaft locations to allow distortion of said parallelogram arrangement at a predetermined point in the lowering of the tongue to allow the latter to move out of parallel with respect to the bed and to contact the ground to function as the ramp for said bed.

12. In a trailer, a bed, a tongue, and operable means to connect said tongue with the bed to raise and lower the tongue with respect to said bed, said tongue comprising a ramp approach to said bed when the tongue is down, and said operable means comprising U-shaped links each having a transverse panel with angularly formed sides, a pair of cross shafts connecting the ends of the sides of the panels with the tongue, and a pair of cross shafts connecting the other ends of the sides with the bed, said shafts being positioned in axial locations forming a parallelogram to cause the tongue to move parallel with respect to said bed, the sides of one of said links being arranged to contact one of the shafts of the other of said links to stop the motion of said one link when the tongue is being lowered, and lost motion means for said links to allow said other link to continue its movement during the lowering of said tongue to let the latter move out of parallel relation with respect to said bed and into reclining contact with the ground to form a ramp approach for said bed.

13. In a trailer having a foldable hitch comprising a tongue for towing, a machinery hauling bed, and operable link mechanism connecting said tongue and bed to join the same and to guide the movements of said tongue in raising and lowering the same, said tongue forming a ramp when lowered for loading machinery onto said bed, and said operable link mechanism comprising a two part unit with each part having pivotal connections at spaced points with said tongue and said bed respectively to lower said tongue in parallel relation with respect to said bed, and means to limit the movement of one of said parts during the lowering of said tongue and to support the adjacent end of said tongue at a fixed point beyond the front end of said bed, the other of said parts having lost motion means to continue its motion and that of the tongue during the lowering of the tongue whereby said latter is adapted to assume an out of parallel position with respect to said bed to incline downwardly from the point of support of said tongue from said first part with the free end of said tongue in angular contact with the surface of the ground.

WILLIAM E. MARTIN.

REFERENCES CITED

The following references are of record in the file of this patent:

UNITED STATES PATENTS

| Number | Name | Date |
| --- | --- | --- |
| 2,131,949 | Helmig | Oct. 4, 1938 |
| 2,418,567 | Ausherman | Apr. 8, 1947 |
| 2,431,436 | Townsend | Nov. 25, 1947 |
| 2,441,710 | Martin | May 18, 1948 |
| 2,443,611 | Ferguson | June 22, 1948 |
| 2,452,789 | Pike | Nov. 2, 1948 |